US010120910B2

(12) United States Patent
Allen et al.

(10) Patent No.: US 10,120,910 B2
(45) Date of Patent: *Nov. 6, 2018

(54) SCORING ATTRIBUTES IN DEEP QUESTION ANSWERING SYSTEMS BASED ON ALGORITHMIC SOURCE CODE INFLUENCES

(71) Applicant: International Business Machines Corporation, Armonk, NY (US)

(72) Inventors: Corville O. Allen, Morrisville, NC (US); Roberto Delima, Apex, NC (US); Thomas J. Eggebraaten, Rochester, MN (US); Marie L. Setnes, Bloomington, MN (US)

(73) Assignee: International Business Machines Corporation, Armonk, NY (US)

( * ) Notice: Subject to any disclaimer, the term of this patent is extended or adjusted under 35 U.S.C. 154(b) by 290 days.

This patent is subject to a terminal disclaimer.

(21) Appl. No.: 14/862,212

(22) Filed: Sep. 23, 2015

(65) Prior Publication Data

US 2016/0179811 A1    Jun. 23, 2016

Related U.S. Application Data

(63) Continuation of application No. 14/574,861, filed on Dec. 18, 2014.

(51) Int. Cl.
*G06F 17/30*    (2006.01)
*G06N 5/04*    (2006.01)
(Continued)

(52) U.S. Cl.
CPC .... *G06F 17/3053* (2013.01); *G06F 17/30345* (2013.01); *G06F 17/30867* (2013.01);
(Continued)

(58) Field of Classification Search
CPC ........... G06F 17/3053; G06F 17/30345; G06F 17/30867; G06F 17/30876; G06N 5/04; G06N 5/02; G06N 5/022
(Continued)

(56) References Cited

U.S. PATENT DOCUMENTS 4,884,217 A * 11/1989 Skeirik ................ G05B 13/028
706/11
4,974,191 A * 11/1990 Amirghodsi .......... G06F 17/277
380/1

(Continued)

FOREIGN PATENT DOCUMENTS

EP      2819031 A1 * 12/2014 ......... G06F 17/3069
WO    2014113786 A1    7/2014

OTHER PUBLICATIONS

Gondek DC, Lally A, Kalyanpur A, Murdock JW, Duboué PA, Zhang L, Pan Y, Qiu ZM, Welty C. "A framework for merging and ranking of answers in DeepQA." IBM Journal of Research and Development. May 2012;56(3.4):14-1.*

(Continued)

*Primary Examiner* — Ben Rifkin
(74) *Attorney, Agent, or Firm* — Patterson + Sheridan, LLP

(57) ABSTRACT

Methods to perform an operation comprising: identifying a first attribute of a source code in a deep question answering system, computing an influence score for the first attribute based on a rule in the source code used to compute a confidence score for each of a plurality of candidate answers generated by the deep question answering system, computing an importance score for the first attribute based at least in part on the computed influence score, and upon determining that the importance score exceeds a predefined threshold, storing an indication that the first attribute is an (Continued)

important attribute relative to other attributes specified in the source code.

8 Claims, 4 Drawing Sheets

(51) Int. Cl.
    *G06N 99/00*     (2010.01)
    *G06N 5/02*     (2006.01)

(52) U.S. Cl.
    CPC ....... *G06F 17/30876* (2013.01); *G06N 5/025* (2013.01); *G06N 5/04* (2013.01); *G06N 99/005* (2013.01)

(58) Field of Classification Search
    USPC .......................................................... 706/45
    See application file for complete search history.

(56) References Cited

U.S. PATENT DOCUMENTS

| | | | | |
|---|---|---|---|---|
| 6,192,360 B1* | 2/2001 | Dumais | ............. | G06F 17/30707 |
| 6,389,588 B1* | 5/2002 | Wadhwa | ................... | G06F 8/74 |
| | | | | 717/106 |
| 8,386,504 B1 | 2/2013 | Wood et al. | | |
| 8,600,796 B1 | 12/2013 | Sterne et al. | | |
| 8,635,204 B1* | 1/2014 | Xie | ........................... | G06F 8/71 |
| | | | | 707/709 |
| 2005/0166193 A1* | 7/2005 | Smith | ....................... | G06F 8/75 |
| | | | | 717/143 |
| 2006/0133666 A1* | 6/2006 | Liu | ....................... | G06K 9/6228 |
| | | | | 382/159 |
| 2009/0178031 A1* | 7/2009 | Zhao | ....................... | G06F 8/427 |
| | | | | 717/143 |
| 2009/0204557 A1* | 8/2009 | Zhang | ................ | G06K 9/00147 |
| | | | | 706/12 |
| 2009/0222400 A1* | 9/2009 | Kupershmidt | ........ | G06N 99/005 |
| | | | | 706/52 |
| 2011/0125734 A1* | 5/2011 | Duboue | ................... | G09B 7/00 |
| | | | | 707/723 |
| 2011/0307875 A1* | 12/2011 | Xu | .......................... | G06F 8/437 |
| | | | | 717/151 |
| 2012/0078636 A1* | 3/2012 | Ferrucci | ............ | G06F 17/30654 |
| | | | | 704/270.1 |
| 2012/0078891 A1* | 3/2012 | Brown | .............. | G06F 17/30654 |
| | | | | 707/723 |
| 2012/0089622 A1* | 4/2012 | Fan | ................... | G06F 17/30675 |
| | | | | 707/749 |
| 2012/0259867 A1* | 10/2012 | Pawar | ............ | G06F 17/30598 |
| | | | | 707/748 |
| 2013/0017523 A1* | 1/2013 | Barborak | ................. | G09B 7/04 |
| | | | | 434/322 |
| 2013/0035930 A1* | 2/2013 | Ferrucci | ............ | G06F 17/30976 |
| | | | | 704/9 |
| 2013/0066643 A1 | 3/2013 | Seward et al. | | |
| 2013/0132308 A1* | 5/2013 | Boss | ................. | G06F 17/30976 |
| | | | | 706/12 |
| 2014/0129661 A1 | 5/2014 | Thyagaraja | | |
| 2014/0149446 A1* | 5/2014 | Kuchmann-Beauger | .................... | |
| | | | | G06F 17/30389 |
| | | | | 707/763 |
| 2014/0310222 A1 | 10/2014 | Davlos et al. | | |
| 2014/0317032 A1 | 10/2014 | Haberman et al. | | |
| 2015/0026106 A1* | 1/2015 | Oh | ...................... | G06F 17/3069 |
| | | | | 706/12 |
| 2015/0058830 A1* | 2/2015 | Verlaguet | .............. | G06F 9/3846 |
| | | | | 717/136 |

OTHER PUBLICATIONS

Poshyvanyk D, Gueheneuc YG, Marcus A, Antoniol G, Rajlich V. "Feature location using probabilistic ranking of methods based on execution scenarios and information retrieval." IEEE Transactions on Software Engineering. Jun. 2007;33(6).*

Osman MH, Chaudron MR, van der Putten P. "Interactive scalable abstraction of reverse engineered uml class diagrams." In Software Engineering Conference (APSEC), 2014 21st Asia-Pacific Dec. 1, 2014 (vol. 1, pp. 159-166). IEEE.*

Manev, Krassimir, Neli Maneva, and Haralambi Haralambiev. "Extracting business rules through static analysis of the source code." (2012).*

Foo, Derek, Jin Guo, and Ying Zou. "Verifying Business Processes Extracted from E-Commerce Systems Using Dynamic Analysis." The 3rd International Workshop on Program Comprehension through Dynamic Analysis. 2007.*

Jain A, Soner S, Rathore AS, Tripathi A. "An approach for extracting business rules from legacy C++ code." In Electronics Computer Technology (ICECT), 2011 3rd International Conference on Apr. 8, 2011 (vol. 5, pp. 90-93). IEEE.*

Greevy O, Ducasse S. "Correlating features and code using a compact two-sided trace analysis approach." in Software Maintenance and Reengineering, 2005. CSMR 2005. Ninth European Conference on Mar. 21, 2005 (pp. 314-323). IEEE.*

Liu L, Qi Q, Li F. "Ontology-based interactive question and answering system." In Internet Technology and Applications, 2010 International Conference on Aug. 20, 2010 (pp. 1-4). IEEE.*

Kalyanpur A, Boguraev BK, Patwardhan S, Murdock JW, Lally A, Welty C, Prager JM, Coppola B, Fokoue-Nkoutche A, Zhang L, Pan Y. "Structured data and inference in DeepQA." IBM Journal of Research and Development. May 2012;56(3.4):10-.*

Yang, Qiang and Jing Wu. "Enhancing the Effectiveness of INteractive Case-Based Reasoning with Clustering and Decision Forests" 2001 Kulwer Acadmeic Publishers. [Online] Downloaded Apr. 5, 2018 https://link.springer.com/content/pdf/10.1023%2FA%3A1008303008006.pdf.*

Hall et al; "The WEKA Data Mining Software: An Update", 2009 SIGKDD Explorations, vol. 11, Issue 1, pp. 10-18.

Allen et al., "Scoring Attributes in Deep Question Answering Systems Based on Algorithmic Source Code Influences", U.S. Appl. No. 14/574,861, filed Dec. 18, 2014.

IBM "List of IBM Patents or Patent Applications Treated as Related".

\* cited by examiner

SCORING ATTRIBUTES IN DEEP QUESTION ANSWERING SYSTEMS BASED ON ALGORITHMIC SOURCE CODE INFLUENCES

CROSS-REFERENCE TO RELATED APPLICATIONS

This application is a continuation of co-pending U.S. patent application Ser. No. 14/574,861, filed Dec. 18, 2014. The aforementioned related patent application is herein incorporated by reference in its entirety.

BACKGROUND

The present disclosure relates to deep question answering systems, and more specifically, to scoring attributes in deep question answering systems based on algorithmic source code influences.

Deep question answering (deep QA) systems receive cases (also referred to as questions) from users. The deep QA systems receive cases from users which include different data elements. The deep QA systems leverage corpora of information to process the cases in an execution pipeline, returning a set of candidate answers as responsive to the cases. Often, however, users do not provide information needed by the deep QA system to generate the most correct response (or answer) to the case. Even without this information, the deep QA system is expected to give a reasonable response to the case.

SUMMARY

Embodiments disclosed herein include methods to perform an operation comprising: identifying a first attribute in a source code of a deep question answering system, computing an influence score for the first attribute based on a rule in the source code used to compute a confidence score for each of a plurality of candidate answers generated by the deep question answering system, computing an importance score for the first attribute based at least in part on the computed influence score, and upon determining that the importance score exceeds a predefined threshold, storing an indication that the first attribute is an important attribute relative to other attributes specified in the source code.

DETAILED DESCRIPTION

Figure 1:
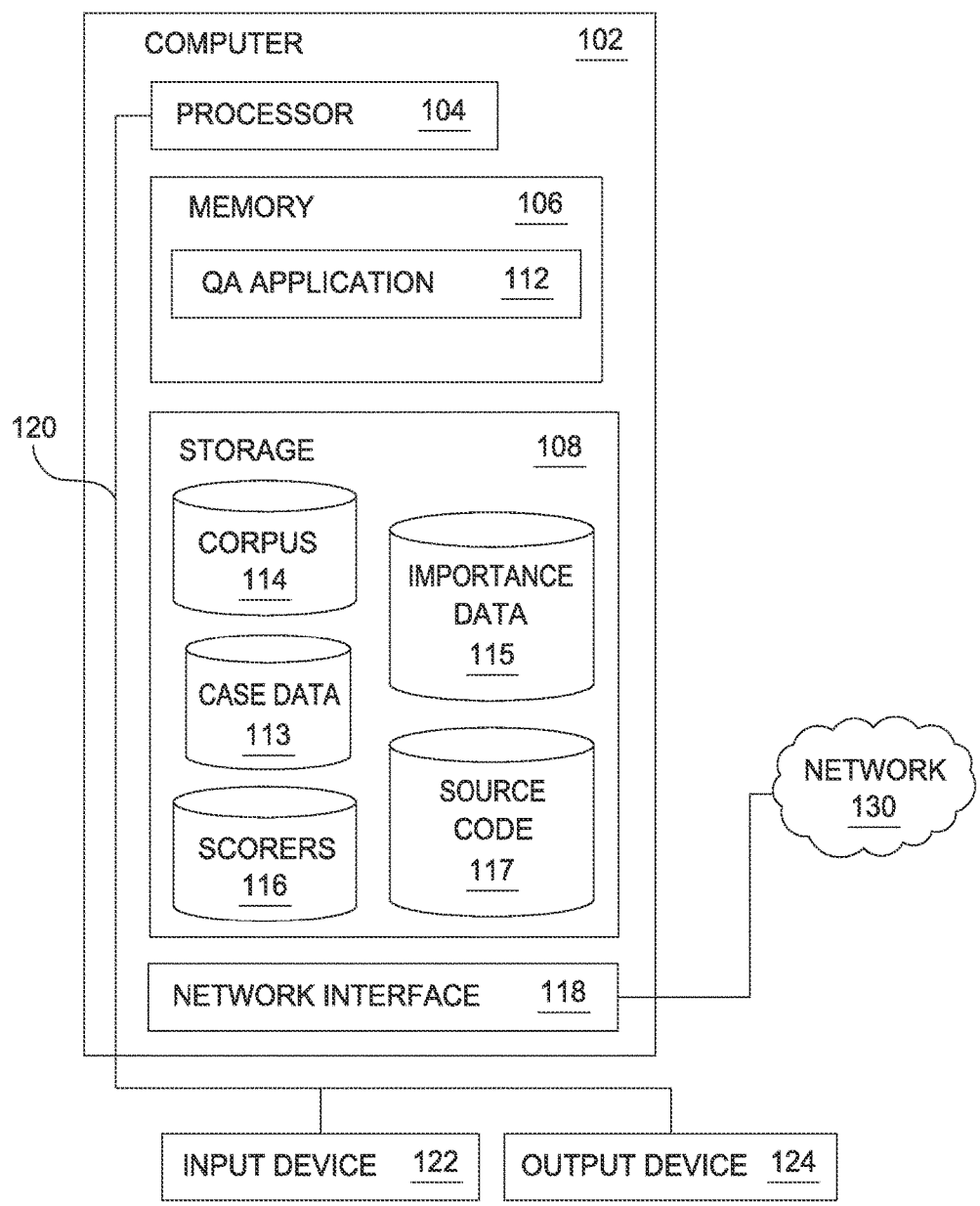
FIG. 1 illustrates a system which scores attributes in a deep question answering system based on algorithmic source code influences, according to one embodiment.

Embodiments disclosed herein provide deep question answering systems (deep QA systems) configured to identify attributes that are important to answering cases received from users by analyzing the source code of the deep QA system. That is, the deep QA system can evaluate the source code of the deep QA system to learn what attributes matter for a class of cases. That is, the deep QA system may learn relationships between different attributes from the source code of the deep QA systems (or relationships between attributes in those cases) that can significantly impact the correctness of an answer. If a user submits a case that lacks one of the identified attributes, the deep QA system may prompt the user to provide a value for the attribute. Before doing so, the deep QA system may determine a measure of how important the missing attribute is to answering that particular case. Generally, the deep QA system may scan the source code to determine which attributes have the greatest influence when computing a response to a case. In at least one embodiment, the deep QA system may compute an influence score for each rule that includes the attribute. The rule may generally be any segment of source code that specifies the attribute, such as an algorithm, module, function, and the like. The influence score may reflect a level of influence the attribute has on a confidence score computed by a scoring algorithm of the deep QA system for each candidate answer that may be returned as responses to the case. In at least one embodiment, the deep QA system may then compute an importance score for the attribute, where the importance score normalizes the number of rules applying the attribute and the respective influence scores for the attribute. If the importance score exceeds a predefined threshold, the deep QA system may determine that the attribute is an important attribute.

For example, the deep QA system may analyze the source code of a scoring algorithm that computes confidence scores for candidate answers. In analyzing the source code of the scoring algorithm, the deep QA system may determine the amount of influence each attribute (or synonyms thereof) has in the scoring algorithm based on the number of times the attribute is specified in the source code, the programming constructs applied to the attribute, where the attribute appears in the source code, and/or any weights applied to the attribute by the source code.

When the deep QA system subsequently receives cases from users that do not specify a value for an important attribute, the deep QA system may prompt the user to provide a value for the important attribute. Doing so may allow the deep QA system to provide more accurate responses to cases without having to first process the case without the value of the important attribute.

Although the medical field is used herein a reference example, embodiments disclosed herein may apply equally to any type of domain. Generally, using the techniques described herein, deep question answering systems may identify important attributes in any domain.

FIG. 1 illustrates a system 100 which scores attributes in a deep question answering system based on algorithmic source code influences, according to one embodiment. The networked system 100 includes a computer system 102. The computer system 102 may also be connected to other computers via a network 130. In general, the network 130 may be a telecommunications network and/or a wide area network (WAN). In a particular embodiment, the network 130 is the Internet.

The computer system 102 generally includes a processor 104 which obtains instructions and data via a bus 120 from a memory 106 and/or a storage 108. The computer 102 may also include one or more network interface devices 118, input devices 122, and output devices 124 connected to the bus 120. The computer system 102 is generally under the control of an operating system (not shown). Examples of operating systems include the UNIX operating system, versions of the Microsoft Windows operating system, and distributions of the Linux operating system. (UNIX is a registered trademark of The Open Group in the United States and other countries. Microsoft and Windows are trademarks of Microsoft Corporation in the United States, other countries, or both. Linux is a registered trademark of Linus Torvalds in the United States, other countries, or both.) More generally, any operating system supporting the functions disclosed herein may be used. The processor 104 is a programmable logic device that performs instruction, logic, and mathematical processing, and may be representative of one or more CPUs. The network interface device 118 may be any type of network communications device allowing the computer 102 to communicate with other computers via the network 130.

The storage 108 is representative of hard-disk drives, solid state drives, flash memory devices, optical media and the like. Generally, the storage 108 stores application programs and data for use by the computer 102. In addition, the memory 106 and the storage 108 may be considered to include memory and storage systems on other systems coupled to the computer system 102.

The input device 122 represents keyboards, mice, controllers, and so on. The output device 124 represents monitors, touch screen displays, and so on.

As shown, the storage 108 includes a case data 113, a corpus 114, an importance data 115, a scorers 116, and a source code 117. The case data 113 includes data related to the case submitted by a user. For example, in a medical setting, the case data 113 may include a patient's medical history, and any other data regarding the patient. The corpus 114 is a body of information used by the QA application 112 to generate answers to questions (also referred to as cases). For example, the corpus 114 may contain scholarly articles, dictionary definitions, encyclopedia references, product descriptions, web pages, and the like. The importance data 115 includes, without limitation, attributes identified in the source code 117 and any influence scores and/or importance scores computed by the QA application 112 for the attribute. The importance data 115 may also include and threshold values (or ranges) for importance scores and influence scores. In addition, the importance data 115 may include parsing rules that the QA application 112 may apply when scanning the source code to identify attributes.

The scorers 116 includes scoring algorithms used by the QA application 112 to compute confidence scores for candidate answers generated by the QA application 112. The source code 117 is a data store including a set of computer instructions written in a human-readable programming language that may be compiled to provide the QA application 112. When compiled, the compiled source code 117 is executable by the processor 104 to provide the functionality of the QA application 112. The source code 117 may include all of the source code currently used to drive the functionality of the QA application 112. The source code 117 may specify a plurality of attributes that are of different levels of importance in returning answers to cases supplied by users. As previously indicated, the QA application 112 may scan the source code 117 to identify which of these attributes are of the most importance to answering a class of cases. Doing so allows the QA application 112 to ensure that values for the important attributes are provided by a user, which in turn allows the QA application 112 to return candidate answers having the greatest levels of confidence.

As shown, the memory 106 contains a QA application 112, which is an application generally configured to provide a deep question answering (QA) system. One example of a deep question answering system is Watson, by the IBM Corporation of Armonk, N.Y. A user may submit a case (also referred to as a question) to the QA application 112. The QA application 112 will then provide an answer to the case based on an analysis of a corpus of information 114. Although depicted as executing on a single computer, the functionality of the QA application 112 may be provided by grid or cluster of computers (not pictured), and the QA application 112 may serve as a frontend to orchestrate such distributed functionality.

The QA application 112 is trained to generate responses to cases during a training phase. During the training phase, the QA application 112 is trained to answer cases using an "answer sheet" which predefines the most correct responses. During training, the QA application 112 ingests content in the corpus 114 to produce one or more machine learning models (not pictured). In addition, during the training phase, the QA application 112 is configured to identify data attributes which are important to answering cases (namely, those attributes having an impact on the confidence score of a given answer).

After being trained, the QA application 112 may process user cases through a runtime analysis pipeline. In at least one embodiment, the case data 113 include medical records of a patient, and the candidate answers returned by the QA application 112 correspond to a set of recommended treatments, ranked by a confidence score of each respective candidate answer. The analysis pipeline executes a collection of analysis programs to evaluate both the question text and candidate answers (i.e., text passages extracted from documents in a corpus 114) in order to construct the most probable correct answer, based on the information extracted from the corpus and from the question. A typical execution pipeline may begin with question analysis, which analyzes and annotates each question presented in the case to identify key topics, concepts, and attributes for conducting a search. The next step of the pipeline may include a primary search, which involves searching for documents in the corpus 114 using the key attributes from the question analysis phase. The next step of the pipeline may generate candidate answers. For example, the QA application 112 may identify key matching passages (based on, for example, topics, concepts, and/or string matching) from the search results with passages in the candidate answers. In the next step of the pipeline, the QA application 112 may then retrieve and process supporting evidence for the candidate answers. The QA application 112 may then complete the pipeline by scoring the various candidate answers, from which the most correct answer identified by the QA application 112 may returned to the user.

In addition, the QA application 112 is configured to identify important attributes (or variables) in the source code 117 of the QA application 112. Generally, an important attribute is an attribute that influences the confidence score of a candidate answer beyond a specified threshold. The QA application 112 may identify important attributes in the source code using a variety of techniques, including identifying a number of times an attribute appears in the source code, where the attribute appears in the source code, the programming constructs applied to the attribute, the type of algorithm specifying the attribute, a stage of the execution pipeline of the QA application 112 where the attribute appears, and any weight applied to the attribute (or synonyms thereof) in the source code. In one embodiment, the QA application 112 identifies "rules" in the source code that relate to an attribute. A "rule," as used herein, includes any logic in the source code applied to a value of an attribute.

For example, a first rule in the source code 117 may specify blood pressure ranges as an attribute that a scorer 116 uses to compute a confidence score for prescribing a medication to treat a patient. The QA application 112 may determine that the blood pressure occurs x number of times in the source code 117 of the scorer 116. The QA application 112 may also determine that the first rule applies different weights for different blood pressure ranges when scoring the medication as a candidate treatment. For example, the first rule may specify that a range of high blood pressure values negatively impacts the confidence score of the treatment (indicating, for example, that a patient having a high blood pressure cannot take the medication). Similarly, the first rule may specify that a range of low blood pressure values positively impacts the confidence score of the treatment (indicating the medication is very beneficial to patients with low blood pressure). As such, the deep QA system may identify blood pressure as having an influence on the candidate answer. In one embodiment, the QA application 112 may compute an influence score for the attribute (blood pressure) to determine the level of influence the attribute has on candidate answer scoring. The QA application 112 may base the influence score on any number of criteria, including, the number of times an attribute appears in the first rule, where the first rule (including the attribute) appears in the source code, the programming constructs the first rule applies to the attribute, the type of algorithm including the first rule, a stage of the execution pipeline of the QA application 112 where the first rule appears, any weight the first rule applies to the attribute, and the number and types of other code segments that call the source code including the first rule. Generally, the QA application 112 may compute influence scores for each rule (or algorithm, module, and the like) that specifies a given attribute.

Once the QA application 112 computes influence scores for sections of source code 117 that reference the attribute, the QA application 112 may compute an importance score for the attribute. In at least one embodiment, the QA application 112 may compare the computed influence score to an influence threshold stored in the importance data 115 to determine that the attribute is of sufficient influence prior to computing the importance score for the attribute. Generally, the importance score of the attribute normalizes each influence score computed for the attribute to determine an overall measure of importance. If the importance score exceeds an importance threshold, the QA application 112 may determine that the attribute is of importance. In one embodiment, the QA application 112 may store an indication that the attribute is important in the importance data 115. When the QA application 112 subsequently receives a case from the user, the QA application 112 may verify that the user supplied values for each attribute listed in the importance data 115 as being of importance to answering the case. If the user does not supply values for important attributes, the QA application 112 may prompt the user to supply a value for the important attribute.

In at least one embodiment, the QA application 112 may order (or rank) a plurality of different attributes based on the respective importance score computed for each attribute. Therefore, if a user submits a case that has missing attributes, the QA application 112 may prompt the user to supply values for each missing attribute, with each attribute being ordered by importance score. By ordering the attributes by importance score, the QA application 112 may call the user's attention to the most important attributes by placing the most important attributes at the top of the list.

Generally, the QA application 112 may scan the source code 117 at any time to identify important attributes therein. In at least one embodiment, the QA application 112 may scan the source code 117 at deployment time, allowing the QA application 112 to identify attributes in the source code 117 that are actually deployed to run the QA application 112. Doing so may allow the QA application 112 to dynamically identify important attributes as algorithms are added and/or removed to the source code 117 (or enabled for a pipeline or class of cases) that currently provides the QA application 112.

Figure 2:
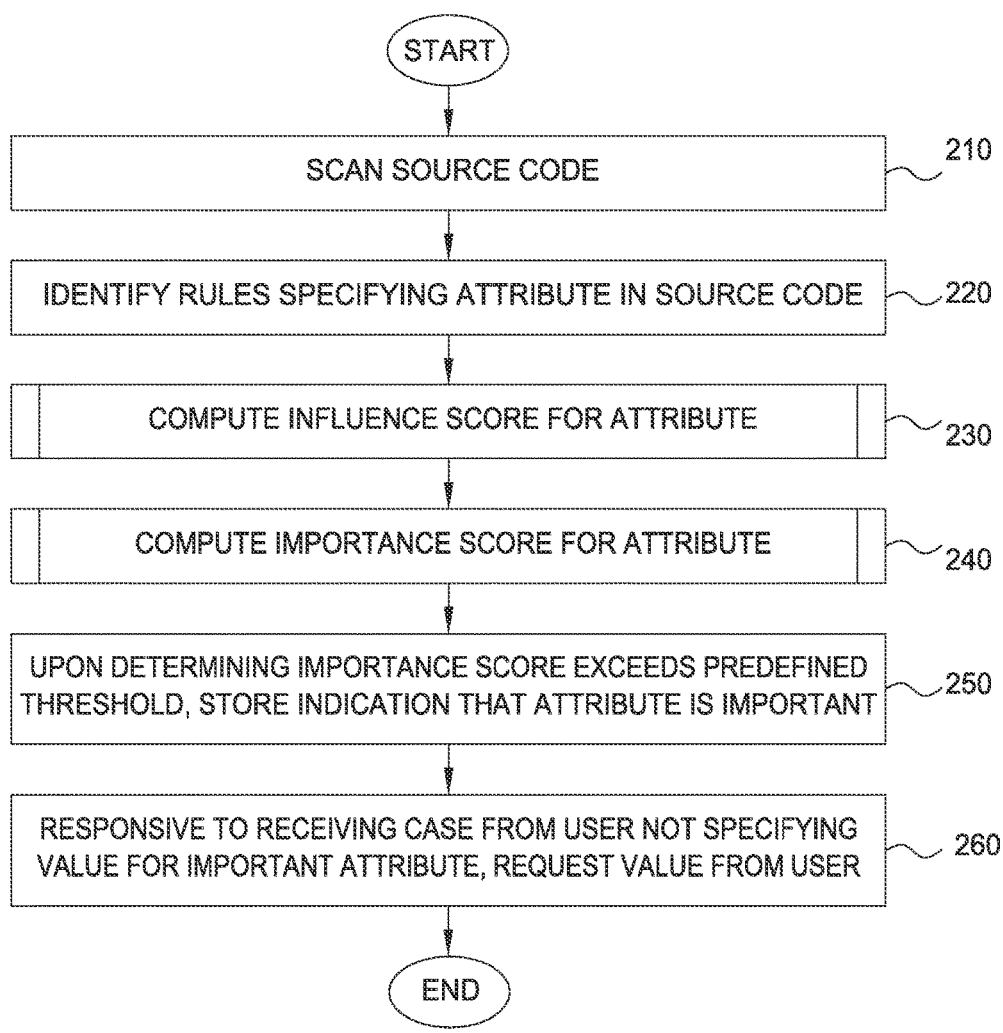
FIG. 2 illustrates a method to identify important attributes in a deep question answering system based on algorithmic source code influences, according to one embodiment.

FIG. 2 illustrates a method 200 to identify important attributes in a deep question answering system based on algorithmic source code influences, according to one embodiment. Generally, the QA application 112 may perform the steps of the method 200 to identify important attributes in the source code 117 of the QA application 112. At step 210, the QA application 112 may scan the source code 117 of the QA application 112. At step 220, the QA application 112 may apply one or more rules in the importance data 115 to identify attributes in the source code 117. In at least one embodiment, the QA application 112 identifies rules, algorithms, or modules including the attribute at step 220. At step 230, the QA application 112 may compute an influence score for each attribute identified in the source code 117. Generally, the influence score may reflect how much the value of a given attribute has on a confidence score computed by a scorer 116 for a candidate answer.

At step 240, the QA application 112 may compute an importance score for the attributes identified in the source code 117. The importance score may reflect a normalized value of all the influence scores computed for a given attribute. At step 250, the QA application 112 may store an indication that the attribute is important upon determining that the importance score of the attribute exceeds a specified importance threshold. At step 260, the QA application 112 may request a value for an important attribute from a user upon determining that the user did not specify a value for the important attribute as part of a case presented to the QA application 112. In at least one embodiment, the QA application 112 may not process the case received at step 260 until the user supplies the value. In other embodiments, the QA application 112 may process the case without the value for the important attribute, present a response to the user, but request that the user specify a value for the important attribute. In such embodiments, the QA application 112 may re-process the case using the value for the important attribute to return a response having a higher confidence score than the response that was returned by processing the case without the value for the important attribute.

Figure 3:
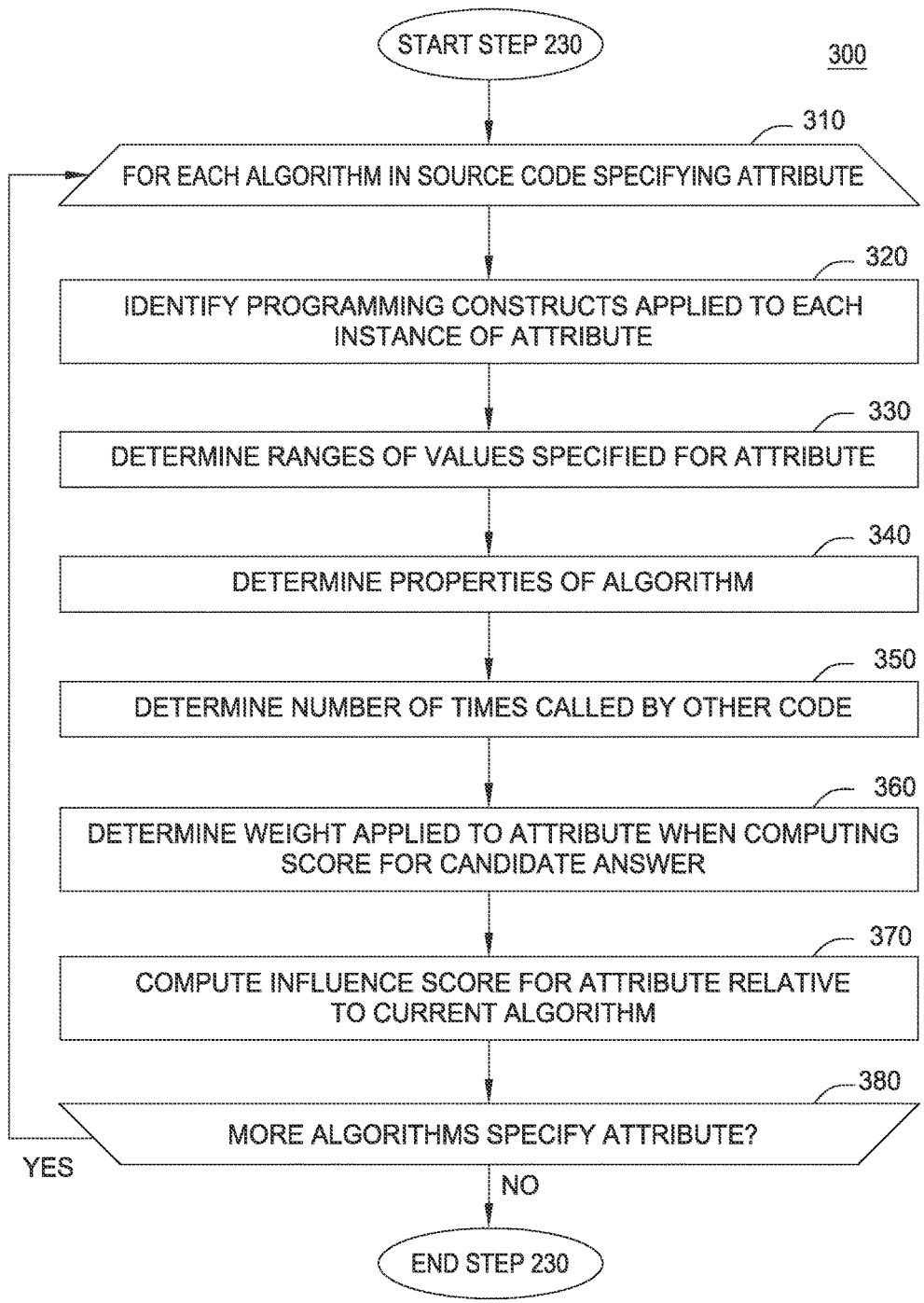
FIG. 3 illustrates a method to compute an influence score for an attribute, according to one embodiment.

FIG. 3 illustrates a method 300 corresponding to step 230, according to one embodiment. That is, FIG. 3 illustrates a method 300 to compute an influence score for an attribute. The QA application 112 may perform the steps of the method 300 for each attribute identified at step 220 as part of the code scan process initiated at step 210.

The method 300 begins at step 310, where the QA application 112 executes a loop including steps 320-380 for each algorithm specifying an attribute identified at step 220. While the steps of the method 300 are discussed relative to each algorithm, the QA application 112 may score the importance of an attribute relative to any other unit of source code, such as functions, modules, or rules. At step 320, the QA application 112 may identify the programming constructs applied to each instance of the attribute in the algorithm. The programming constructs include, without limitation, mathematical operations, function calls, and the like. For example, a patient's blood pressure may be multiplied by a factor of X, while the patient's cholesterol may be divided by a factor of Y by two different programming constructs. At step 330, the QA application 112 may identify any ranges of values for a specified attribute. For example, a first programming construct may specify five different weights to apply to five different ranges of prostate specific antigen (PSA) values used to determine a suitable dosage of chemotherapy drugs for a patient. The weights may generally reflect that the higher the PSA, the greater the amount of chemotherapy drugs the patient should be prescribed. By identifying the ranges (and weights), the QA application 112 may determine that the patient's PSA is of influence.

At step 340, the QA application 112 may determine the properties of the algorithm including the attribute. The properties may include the type of algorithm, the algorithm's place in the processing pipeline, the algorithm's place in the source code, and the like. At step 350, the QA application 112 may determine the number of times the current algorithm is called by other segments of code in the source code 117. The QA application 112 may leverage the number of times the current algorithm is called to infer the importance of the current algorithm. For example, the QA application 112 may determine that the more times the current algorithm is called by other segments of code, the more important the current algorithm (and therefore the attributes therein). At step 360, the QA application 112 may determine if the algorithm applies an express weight to the attribute when computing a score for a candidate answer. For example, the source code of a scorer in the scorers 116 indicates that the final confidence score of a candidate answer is directly proportional to a patient's age. Similarly, the source code of the scorer may indicate that a patient's dosage is multiplied by a normalized body mass index (BMI) value. The QA application 112 may consider these express weights applied to the attributes when computing respective influence scores for the attributes.

At step 370, the QA application 112 may compute an influence score for the attribute relative to the current algorithm (or other unit of source code). The QA application 112 may compute the influence score according to any suitable algorithm, and may produce influence scores of any range. Generally, the QA application 112 may compute the influence score based on any number of criteria, including, without limitation, the determinations made at steps 320-360. The QA application 112 may then store the computed influence score for the attribute relative to the current algorithm in the importance data 115. At step 380, the QA application 112 may determine whether more algorithms were identified at step 220 that include the current attribute. If more algorithms remain, the QA application 112 returns to step 310. Otherwise, the method 300 ends.

Figure 4:
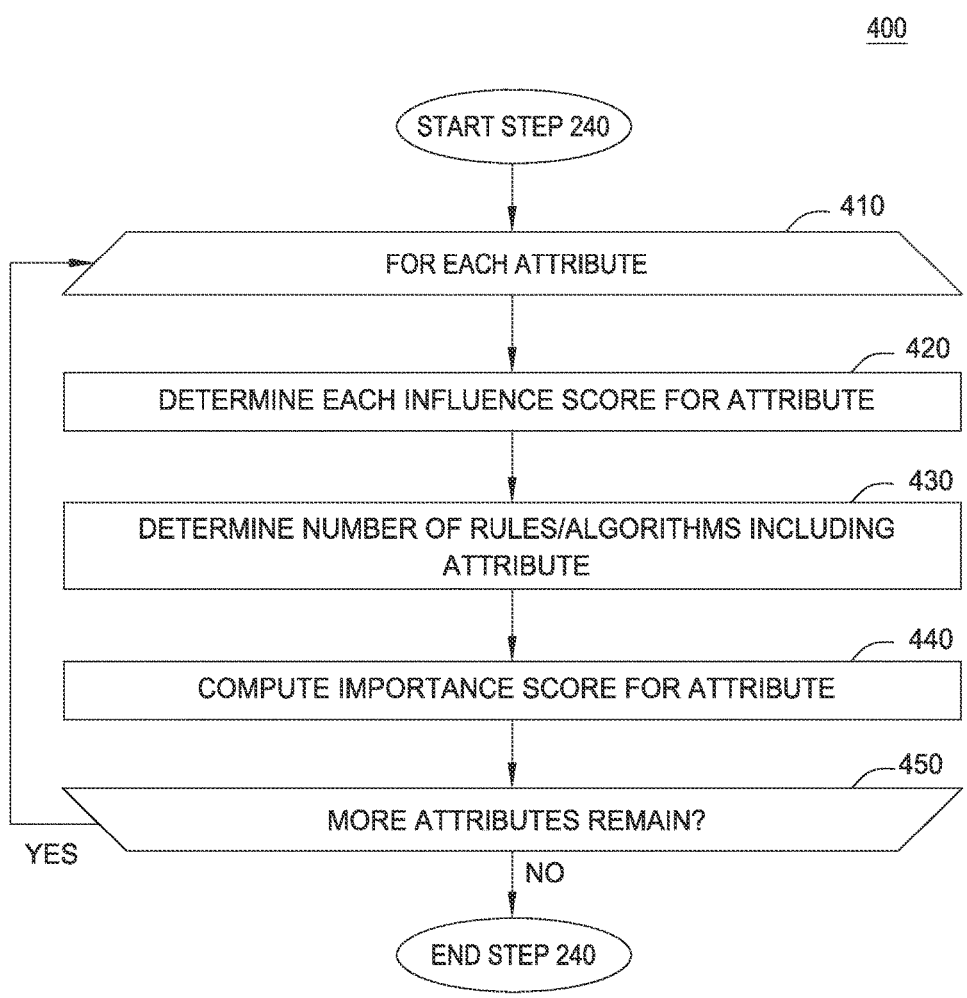
FIG. 4 illustrates a method to compute an importance score for an attribute, according to one embodiment.

FIG. 4 illustrates a method 400 corresponding to step 240, according to one embodiment. That is, FIG. 4 illustrates a method 400 to compute an importance score for an attribute. In at least one embodiment, the QA application 112 performs the steps of the method 400. The method 400 begins at step 410, where the QA application 112 executes a loop including steps 420-450 for each attribute the QA application 112 computed one or more influence scores for at step 370. At step 420, the QA application 112 may determine each influence score computed at step 370 for the current attribute. At step 430, the QA application 112 may determine the number of algorithms that include the current attribute. At step 440, the QA application 112 may compute the importance score for the attribute. In at least one embodiment, the QA application 112 computes the importance score using an algorithm that takes, as input, the number of algorithms specifying the attribute and the respective influence scores for each attribute relative to the algorithm. Generally, the QA application 112 may produce an importance score that falls into any range of values. The QA application 112 may store the computed importance score in the importance data 115. At step 450, the QA application 112 may determine whether more attributes remain. If more attributes having a computed influence score remain, the QA application 112 may return to step 410. If no more attributes remain, the method 400 ends.

Advantageously, embodiments disclosed herein identify important attributes in the source code of a deep question answering system. By identifying the attributes that are most influential in the source code, the deep question answering system may ensure that users specify values for all important attributes, allowing the deep question answering system to return more accurate results.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the foregoing, reference is made to embodiments presented in this disclosure. However, the scope of the present disclosure is not limited to specific described embodiments. Instead, any combination of the recited features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the recited aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system."

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the disclosure may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present disclosure, a user may access applications or related data available in the cloud. For example, the QA application 112 could execute on a computing system in the cloud and the scan source code of the QA application 112 to identify important attributes therein. In such a case, the QA application 112 could compute importance scores for the attributes and store the importance scores at a storage location in the cloud. Doing so allows a user to access this information from any computing system attached to a network connected to the cloud (e.g., the Internet).

While the foregoing is directed to embodiments of the present disclosure, other and further embodiments of the disclosure may be devised without departing from the basic scope thereof, and the scope thereof is determined by the claims that follow.

What is claimed is:

1. A method, comprising:
    identifying a first variable in a source code of a question answering (QA) system;
    upon determining that a weight applied to a value of the first variable by a first rule in the source code increases a confidence score for candidate answers generated by the QA system beyond a threshold;
        computing an influence score for the first variable based on: (i) the weight applied to the value of the variable by the first rule in the source code, (ii) a number of rules specifying weights applied to values of the first attribute, (iii) a location of the first attribute in each rule, (iv) a number of times the first variable is used in each rule, (v) a type of operation applied to the value of the first variable by each respective rule, and (vi) an identified phase of a processing pipeline of the QA system in which each respective rule is applied;
        computing an importance score for the first variable based at least in part on the computed influence score; and
    upon determining that the importance score exceeds a predefined threshold, storing an indication that the first variable is an important variable relative to other variables specified in the source code;
    receiving, by the QA system, a case that does not specify a value for the first variable; and
    refraining, by the QA system, from processing the case.

2. The method of claim 1, further comprising:
    outputting, to a user, a request to provide a value for the first variable;
    receiving, from the user, a first value for the variable; and
    processing, by the QA system, the case using the first value for the variable.

3. The method of claim 1, wherein the influence score for the first variable is further based on a respective weight applied to each of a plurality of possible values for the first variable specified in the first rule.

4. The method of claim 1, wherein the first variable is identified during a code scan of the source code of each of a plurality of scorers configured to compute confidence scores for candidate answers in the QA system.

5. The method of claim 1, wherein the confidence score specifies a level of confidence that a response to a case generated by the deep question answering system is correct, wherein the source code comprises a current source code of the QA system.

6. The method of claim 1, further comprising:
    identifying a second variable in the source code of the QA system;
    determining that a weight applied to a value of the second variable by a second rule in the source code increases the confidence score for candidate answers generated by the QA system beyond the threshold;
    computing an influence score for the second variable based on the weight applied to the value of the second variable by the second rule in the source code;
    computing an importance score for the second variable based at least in part on the computed influence score for the second variable; and
    determining that the importance score exceeds the predefined threshold.

7. The method of claim 6, further comprising:
    receiving, by the QA system, a case that does not specify values for at least the first and second variables;
    determining that the importance score for the first variable is greater than the importance for the second variable; and
    outputting, to a user, a request to provide values for the first and second variables, wherein the request is ordered based on the importance score of the first variable being greater than the importance score of the second variable.

8. The method of claim 7, wherein the case does not specify values for a plurality of variables including the first and second variables, the method further comprising:
    generating an ordered list of the plurality of variables, wherein the list is ordered according to the importance score of each variable;
    outputting the ordered list to the user;
    receiving, from the user, values for each of the plurality of variables; and processing, by the QA system, the case based on the values for each of the plurality of variables provided by the user.

* * * * *